US011911855B2

(12) United States Patent
Miyazaki (10) Patent No.: US 11,911,855 B2
(45) Date of Patent: Feb. 27, 2024

(54) WELDING TOOL FOR ROBOT AND ROBOT

(71) Applicant: FANUC CORPORATION, Yamanashi (JP)

(72) Inventor: Kiichi Miyazaki, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 626 days.

(21) Appl. No.: 17/002,224

(22) Filed: Aug. 25, 2020

(65) Prior Publication Data

US 2021/0078117 A1    Mar. 18, 2021

(30) Foreign Application Priority Data

Sep. 18, 2019   (JP) .................. 2019-169251

(51) Int. Cl.
*B23K 37/047*    (2006.01)
*B23K 9/095*    (2006.01)
(Continued)

(52) U.S. Cl.
CPC .......... *B23K 37/047* (2013.01); *B23K 9/0956* (2013.01); *B25J 11/005* (2013.01);
(Continued)

(58) Field of Classification Search
CPC .......... B23K 9/00; B23K 9/0026–0043; B23K 37/02; B23K 37/0211; B23K 37/0217;
(Continued)

(56) References Cited

U.S. PATENT DOCUMENTS

| | | | |
|---|---|---|---|
| 5,486,678 A * | 1/1996 | Hofmann | B23Q 1/72 219/127 |
| 2005/0199601 A1 | 9/2005 | Inoue et al. | |
| 2015/0246406 A1 | 9/2015 | Takayama | |
| 2020/0009676 A1* | 1/2020 | Inoue | B23K 9/0203 |

(Continued)

FOREIGN PATENT DOCUMENTS

| EP | 1574302 A1 | 9/2005 |
|---|---|---|
| EP | 3517243 A1 | 7/2019 |

(Continued)

OTHER PUBLICATIONS

Japanese Notice to Grant a Patent dated May 2, 2023, for Japanese Patent Application No. 2019-169251.

*Primary Examiner* — Tu B Hoang
*Assistant Examiner* — Damon Joel David Alfaro
(74) *Attorney, Agent, or Firm* — KARCESKI IP LAW, PLLC (57) ABSTRACT

A welding tool for a robot welds together a first component and a second component by using a metallic welding element disposed within a through-hole in the second component. The welding tool includes a welding torch attached to an arm, an element pusher that is attached to a distal end of the arm and disposes the held welding element between the welding torch and the through-hole and disposes at least a part of the welding element within the through-hole, a component pusher attached to the distal end of the arm and movable in an axial direction of a distal end of the welding torch, and a driving device that presses the component pusher against the second component. The element pusher is movable in the axial direction relative to the component pusher.

6 Claims, 9 Drawing Sheets

(51) Int. Cl.
*B25J 19/02* (2006.01)
*B25J 15/00* (2006.01)
*B25J 15/02* (2006.01)
*B25J 11/00* (2006.01)

(52) U.S. Cl.
CPC ........... *B25J 15/0019* (2013.01); *B25J 15/02* (2013.01); *B25J 19/021* (2013.01)

(58) Field of Classification Search
CPC ................ B23K 37/0223; B23K 37/04; B23K 37/0408; B23K 37/0426; B23K 37/0435; B23K 37/0443; B23K 2103/02; B23K 2103/08; B23K 2103/18; B23K 9/02; B23K 9/0203; B23K 9/0206; B23K 9/232; B23K 9/32
See application file for complete search history.

(56) References Cited

U.S. PATENT DOCUMENTS

2020/0384567 A1\* 12/2020 Suzuki ................... B21D 28/26
2021/0086291 A1\* 3/2021 Okada ................ B23K 20/1245

FOREIGN PATENT DOCUMENTS

| | | |
|---|---|---|
| EP | 3563961 A1 | 11/2019 |
| JP | S6089971 U | 6/1985 |
| JP | H08118023 A | 5/1996 |
| JP | 2005254404 A | 9/2005 |
| JP | 2008296226 A | 12/2008 |
| JP | 2009241254 A | 10/2009 |
| JP | 2015163407 A | 9/2015 |
| JP | 2018034166 A | 3/2018 |
| JP | 2018051570 A | 4/2018 |
| JP | 2018103240 A | 7/2018 |
| JP | 3222313 U \* | 7/2019 ............. B21D 28/26 |
| JP | 2020006390 A | 1/2020 |
| WO | 2018042680 A1 | 3/2018 |

\* cited by examiner

WELDING TOOL FOR ROBOT AND ROBOT

CROSS-REFERENCE TO RELATED APPLICATIONS

This application is based on and claims priority to Japanese Patent Application No. 2019-169251, filed on Sep. 18, 2019, the content of which is incorporated herein by reference in its entirety.

FIELD OF THE INVENTION

The present invention relates to welding tools for robots and robots.

BACKGROUND OF THE INVENTION

In a known technology in the related art for welding dissimilar materials, namely, a first component made of, for example, iron and a second component made of, for example, aluminum, the first component and the second component are welded together by providing a through-hole in the second component, inserting a welding element made of iron into the through-hole, and melting the welding element. For specific examples, reference is made to Japanese Unexamined Patent Application, Publication No. 2018-34166, and to Japanese Unexamined Patent Application, Publication No. 2018-103240.

SUMMARY OF THE INVENTION

A first aspect of the present disclosure provides a welding tool for a robot that welds together a first component made of a first metal and a second component made of a second metal by using a metallic welding element disposed within a through-hole provided in the second component. The welding tool includes, a welding torch attached to an arm of a robot, an element pusher that is attached to a distal end of the arm, is capable of holding the welding element, and disposes the held welding element between the welding torch and the through-hole and disposes at least a part of the welding element within the through-hole, a component pusher attached to the distal end of the arm and movable in an axial direction of a distal end of the welding torch, and a driving device that presses the component pusher against the second component so as to push the second component toward the first component. The element pusher is movable in the axial direction relative to the component pusher.

A second aspect of the present disclosure provides a robot that welds together a first component made of a first metal and a second component made of a second metal by using a metallic welding element disposed within a through-hole provided in the second component. The robot includes, an arm, a controller which controls motion of the arm; a welding torch attached to the arm, an element pusher that is attached to a distal end of the arm, is capable of holding the welding element, and disposes the held welding element between the welding torch and the through-hole and disposes at least a part of the welding element within the through-hole, a component pusher attached to the distal end of the arm and movable in an axial direction of a distal end of the welding torch, and a driving device that presses the component pusher against the second component so as to push the second component toward the first component. The element pusher is movable in the axial direction relative to the component pusher.

DESCRIPTION OF EMBODIMENT(S) OF THE INVENTION

A vertical articulated robot 1 and a tool 2 serving as a welding tool for a robot according to an embodiment will be described below with reference to the drawings.

Figure 2:
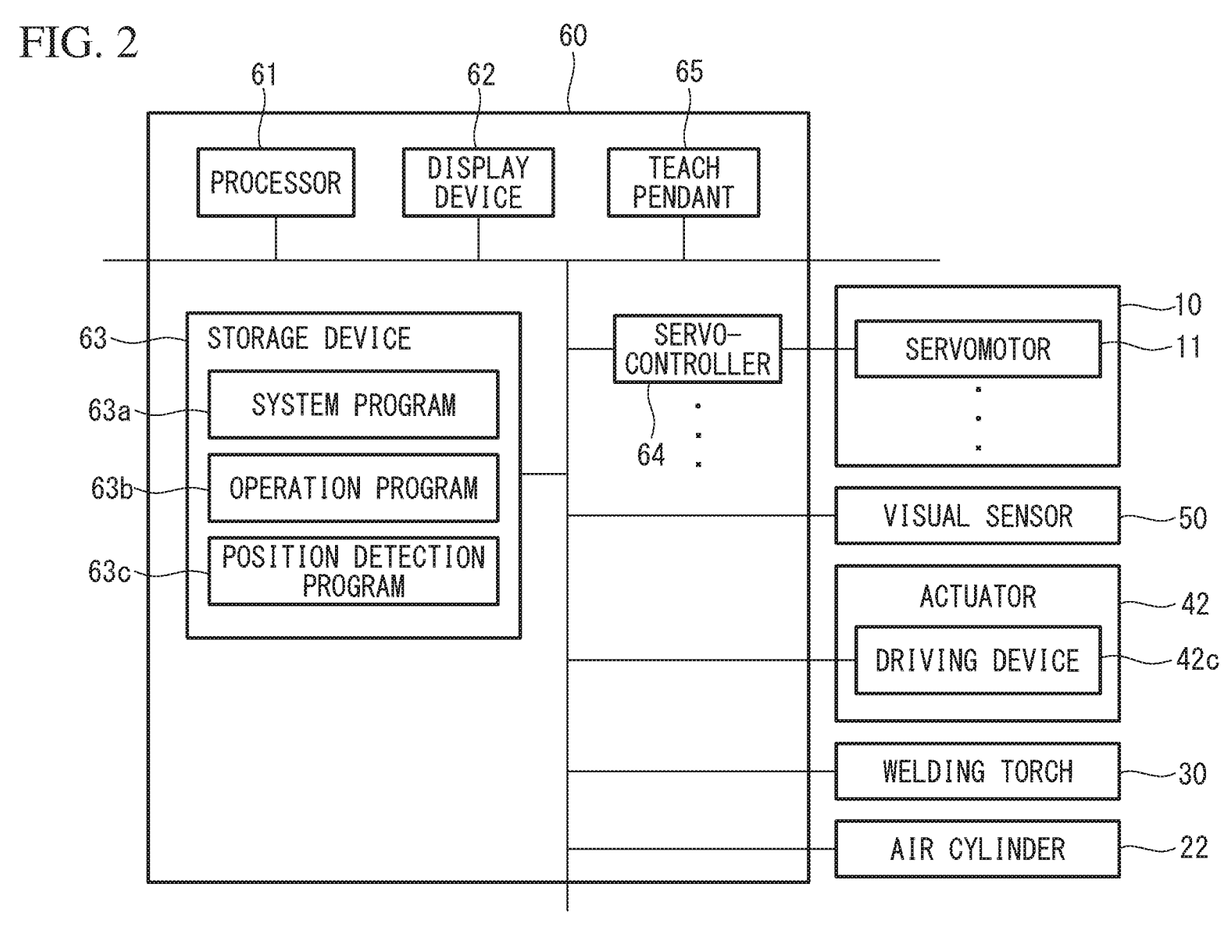
FIG. 2 is a block diagram of a controller of the robot according to this embodiment.

An arm 10 of the robot 1 includes a plurality of arm members and a plurality of joints, as well as a plurality of servomotors 11 that drive the corresponding arm members at the plurality of joints (see FIG. 2). The servomotors 11 used may be various types of servomotors, such as rotary motors and linear motors. Each servomotor 11 contains an operation position detector that detects the operation position thereof, such as an encoder. A detection value of the operation position detector is transmitted to a controller 60, to be described later.

Figure 1:
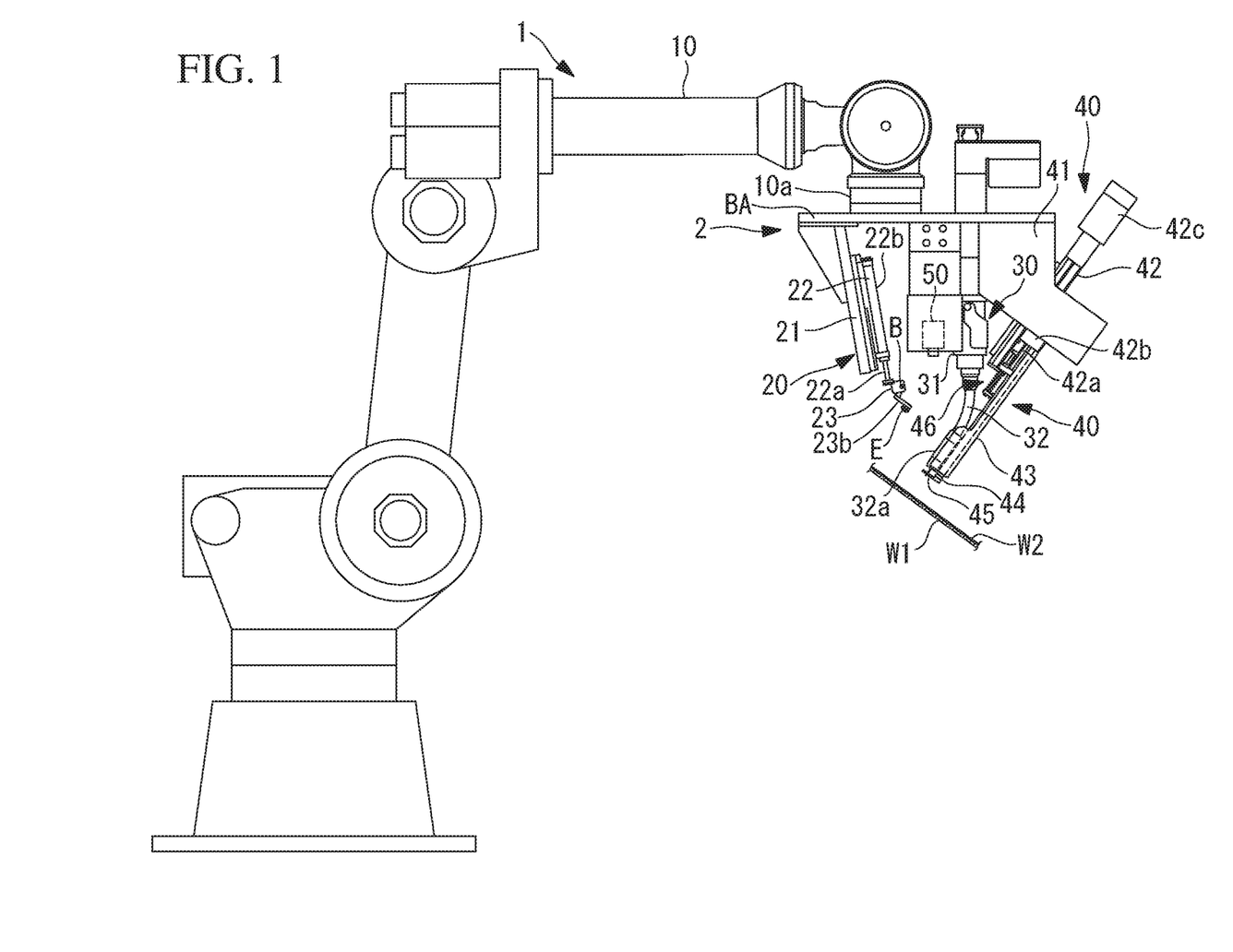
FIG. 1 is a front view of a robot according to an embodiment.

As shown in FIG. 1, the tool 2 is attached to the distal end of the arm 10 of the robot 1. A first component W1 and a second component W2 are welded together by using the tool 2. In this embodiment, the robot 1 uses the tool 2 to insert a welding element E into a through-hole H provided in the second component W2 and melts the welding element E by means of an arc discharge, thereby welding together the first component W1 and the second component W2 by means of the welding element E.

In this embodiment, the first component W1 and the welding element E are made of iron as a first metal, and the second component W2 is made of a nonferrous metal, such as an aluminum alloy or a magnesium alloy, as a second metal. However, the combination is not limited to this.

The tool 2 has, for example, a base member BA fixed to a flange member 10*a* at the distal end of the arm 10 of the robot 1, and also has an element feeder 20, a welding torch 30, an actuator 40, and a visual sensor 50 that are supported by the base member BA.

The welding torch 30 used may be a known welding torch for arc welding. The welding torch 30 according to this embodiment has a torch body 31 and a tube 32 extending from the torch body 31. The distal end of the tube 32 is provided with a gas nozzle 32*a*, and an electrode 32*b* (FIG. 4) made of, for example, tungsten is disposed within the gas nozzle 32*a*. The torch body 31 is fixed to the base member BA, whereby the torch body 31 is attached to the distal end of the arm 10. Alternatively, the second arm member from the distal end of the arm 10 may support the torch body 31.

Figure 3:
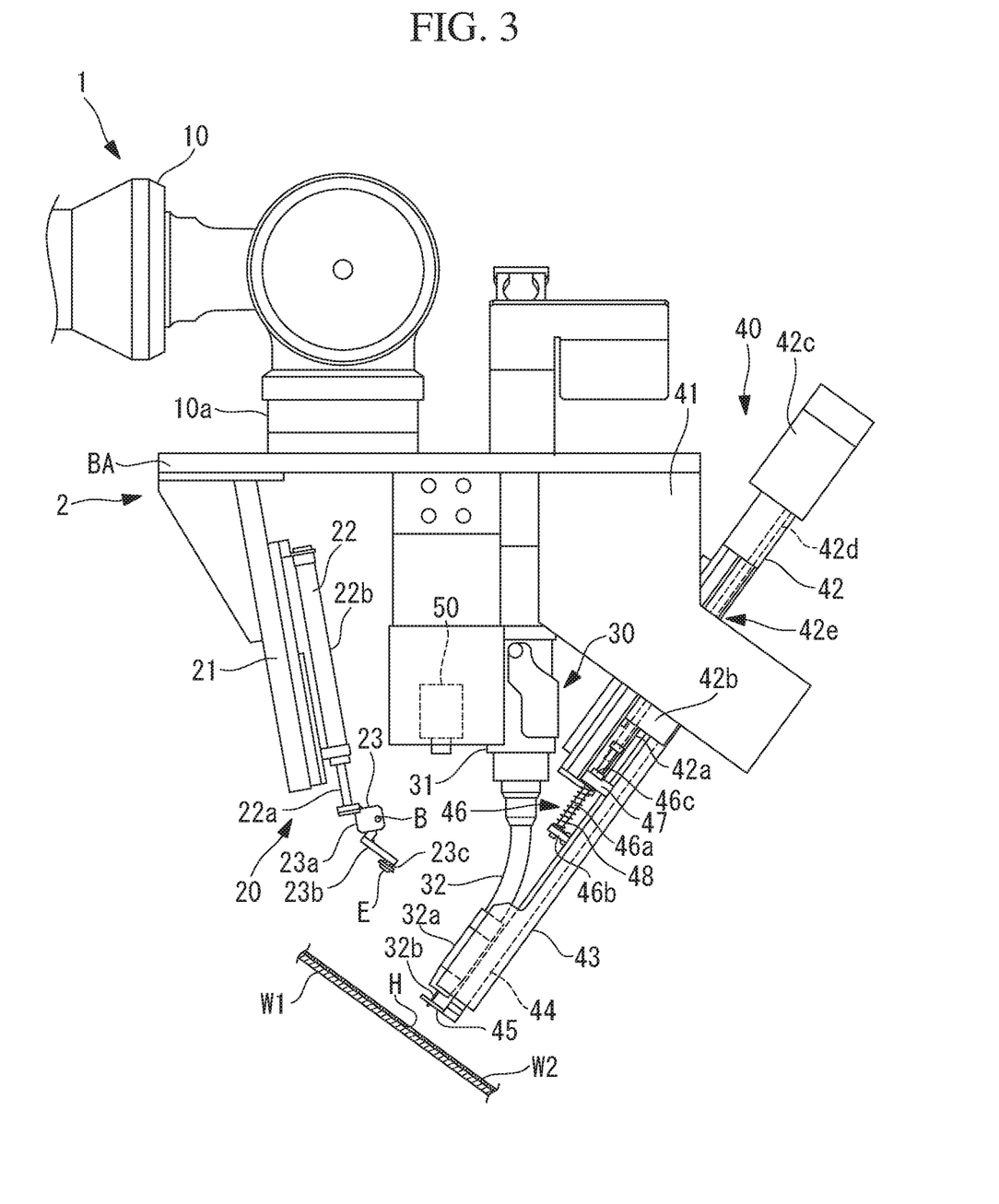
FIG. 3 is a front view of a tool and a distal end of the robot according to this embodiment.

As shown in FIGS. 1 and 3, the element feeder 20 has a first support member 21 having one end fixed to the base member BA and the other end extending away from the base member BA. Furthermore, the element feeder 20 has an air cylinder 22 serving as a linear driver fixed to the first support member 21 and an element supporter 23 fixed to one end of a rod 22a of the air cylinder 22. As an alternative to the air cylinder 22, an electric cylinder, such as a linear guide, a hydraulic cylinder, or a known linear motion mechanism may be used.

The air cylinder 22 has a cylinder 22b in which the other end of the rod 22a is disposed, and the cylinder 22b is supplied with air from an air supplier (not shown). For example, a distal-end chamber and a base-end chamber of the cylinder 22b are arbitrarily supplied with air from the air supplier, thereby setting the rod 22a to a maximally protruding state or a retracted state.

As shown in FIG. 3, the element supporter 23 has a support base 23a fixed to the distal end of the rod 22a and a support member 23b one end of which is fixed to the support base 23a. The one end of the support member 23b is attached to the support base 23a by using a bolt B. By temporarily loosening the bolt B, the orientation of the support member 23b relative to the support base 23a can be adjusted. A magnet 23c is fixed to the support member 23b, and the welding element E is supported by the support member 23b by means of the magnet 23c.

As shown in FIG. 3, the actuator 40 has a second support member 41 having one end fixed to the base member BA and the other end extending away from the base member BA. The actuator 40 also has an actuator 42 fixed to the second support member 41. The actuator 42 has a rail 42a that extends in a direction intersecting the axial direction of the air cylinder 22 and a slider 42b that moves along the rail 42a. The actuator 42 also has a driving device 42c, such as a servomotor, for driving the slider 42b along the rail 42a. Moreover, the actuator 42 has a ball screw mechanism 42e equipped with a screw member 42d that is screwed to a part of the slider 42b and that is rotated by the driving device 42c. The actuator 42 used may be a known linear guide. Alternatively, another linear motion mechanism may be used as the actuator 42.

As shown in FIG. 3, the actuator 40 has a component pusher 43 fixed to the slider 42b. The component pusher 43 extends in a direction along the rail 42a. The component pusher 43 moves together with the slider 42b along the rail 42a relative to the welding torch 30. The moving direction of the component pusher 43 is along the axial direction of the gas nozzle 32a or the electrode 32b at the distal end of the welding torch 30.

Although the component pusher 43 in this embodiment is U-shaped or C-shaped in cross section, the cross-sectional shape may be another shape. The gas nozzle 32a of the welding torch 30 is disposed inside the component pusher 43 at one end thereof, and the other end of the component pusher 43 is fixed to the slider 42b.

As shown in FIG. 3, the actuator 40 has an element pusher 44 extending longitudinally in the direction along the rail 42a. The element pusher 44 is supported by the second support member 41, the actuator 42, or the component pusher 43. The element pusher 44 is movable in the direction along the rail 42a relative to the welding torch 30, the rail 42a of the actuator 42, and the component pusher 43. The moving direction of the element pusher 44 is a direction along an axial direction of the electrode 32b of the gas nozzle 32a at the distal end of the welding torch 30.

Figure 4:
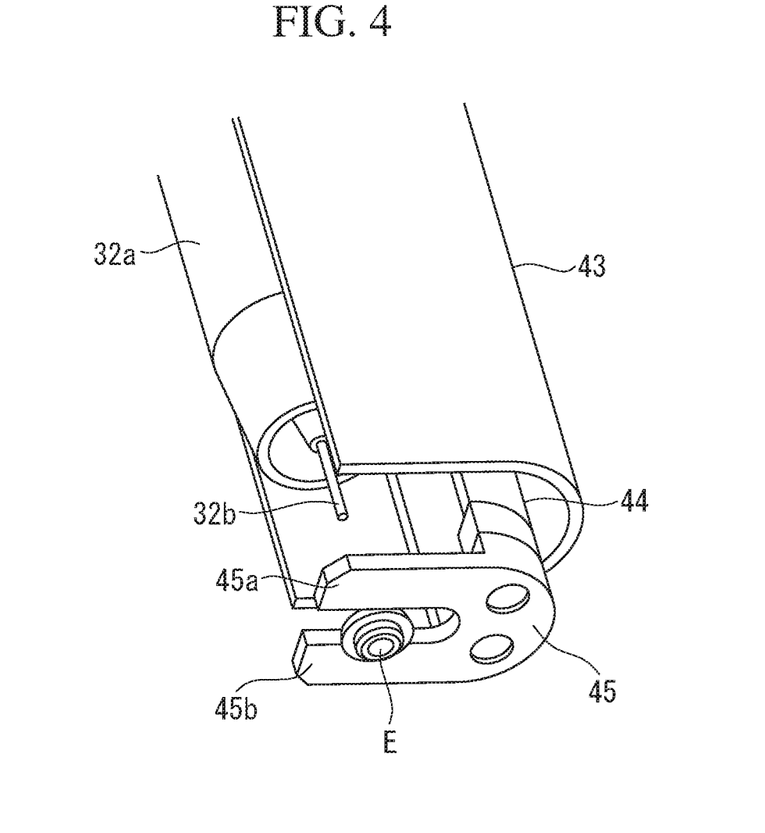
FIG. 4 is a perspective view of a part of the tool according to this embodiment.

One end of the element pusher 44 is provided with an element holder 45 for holding the welding element E. The element holder 45 is made of a material with low electrical conductivity (i.e., an insulating material). For example, the element holder 45 is made of plastic. The element holder 45 has a first claw 45a and a second claw 45b facing the first claw 45a. As shown in FIG. 4, the element holder 45 uses the first claw 45a and the second claw 45b to hold the outer periphery of the welding element E.

Figure 5:
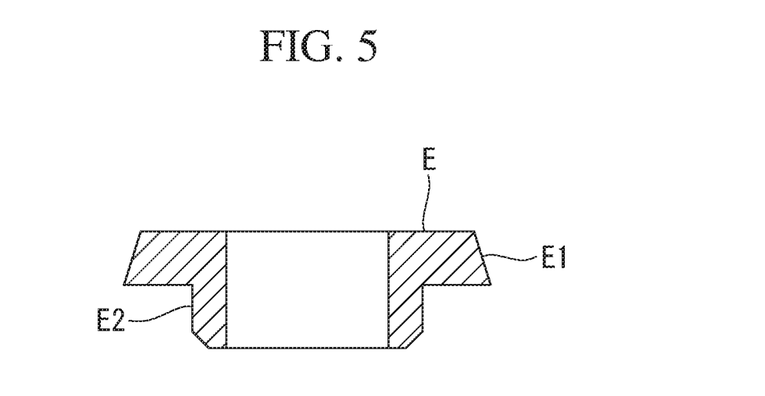
FIG. 5 is a cross-sectional view of a welding element used in dissimilar metal welding according to this embodiment.

In one example, the welding element E has a large-diameter section E1 and a small-diameter section E2, as shown in FIG. 5, and the large-diameter section E1 is held by the element holder 45.

In this embodiment, an intermediate section of the element pusher 44 in the longitudinal direction thereof has an attaching member 46 fixed thereto. The attaching member 46 has a shaft member 46a extending in the direction along the rail 42a. One end of the shaft member 46a is fixed to the intermediate section of the element pusher 44 by means of a fixing member 46b. The other end of the shaft member 46a is supported in a movable manner by a support member 47 fixed to an intermediate section of the component pusher 43 in the longitudinal direction thereof. The shaft member 46a is movable in the direction along the rail 42a relative to the component pusher 43.

A biasing member 48, such as a coil spring, is provided between the fixing member 46b and the support member 47. The biasing member 48 biases the element pusher 44 toward the one end thereof relative to the component pusher 43. The other end of the shaft member 46a is provided with an abutment section 46c. The abutment section 46c abuts on the support member 47, so that the movement of the element pusher 44 toward the one end thereof relative to the component pusher 43 is regulated.

Examples of the visual sensor 50 used include a known two-dimensional camera, a known three-dimensional camera, and a known three-dimensional distance sensor.

As shown in FIG. 2, the controller 60 of the robot 1 includes, for example, a processor 61 having a central processing unit (CPU) and a random access memory (RAM), a display device 62, a storage device 63, such as a nonvolatile storage unit or a read-only memory (ROM), a plurality of servo-controllers 64 each corresponding to the servomotor 11 of the robot 1, and a teach pendant 65 that is connected to the controller 60 and that can be carried by an operator. The teach pendant 65 may be configured to be wirelessly communicable with the controller 60.

The welding torch 30, the air cylinder 22, and the driving device 42c are connected to the controller 60, so that the welding torch 30, an electromagnetic valve of the air cylinder 22, and the driving device 42c are controlled by the controller 60.

The storage device 63 has a system program 63a stored therein. The system program 63a is responsible for a basic function of the controller 60. Furthermore, an operation program 63b and a position detection program 63c for detecting the position of the through-hole H provided in the second component W2 are stored in the storage device 63.

Based on the operation program 63b, the controller 60 control the robot 1 to dispose the tool 2 at a position to perform the welding operation and to cause the robot 1 and the tool 2 to weld the first component W1 and the second component W2 together. Furthermore, in order to dispose the tool 2 at the welding position, the controller 60 performs detection of the position of the through-hole H based on the position detection program 63c. The process performed in the controller 60 based on the operation program 63b and the position detection program 63c will be described below with reference to a flowchart in FIG. 6.

Figure 6:
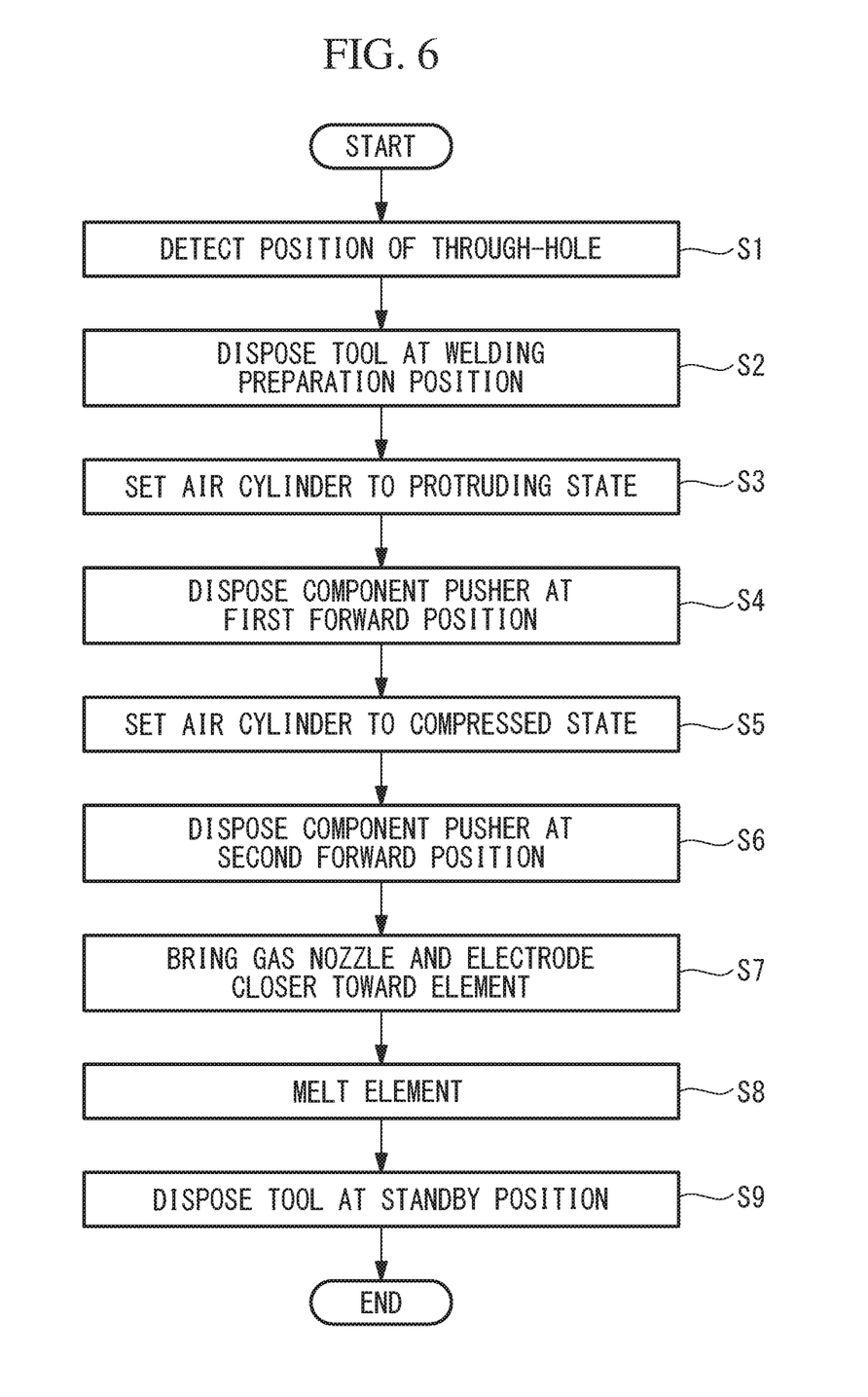
FIG. 6 is a flowchart illustrating an example of a process in the controller of the robot according to this embodiment.

First, the controller 60 performs known image processing, such as binary processing and edge processing, on an image detected by the visual sensor 50 and detects the position of the through-hole H in the second component W2 by using the processed image (step S1). Then, in a state where the welding element E is supported by the support member 23b of the element supporter 23, the controller 60 moves the arm 10 by controlling the servomotors 11, so as to dispose the tool 2 at a welding preparation position corresponding to the detected position of the through-hole H, as shown in FIG. 3 (step S2).

If the position where the tool 2 is to be disposed is predetermined, for example, step S1 may be omitted. Furthermore, a dedicated machine may be used to feed the welding element E to the support member 23b, or the robot 1 may move the tool 2 toward the feeder of the welding element E to feed the welding element E to the support member 23b.

Figure 7:
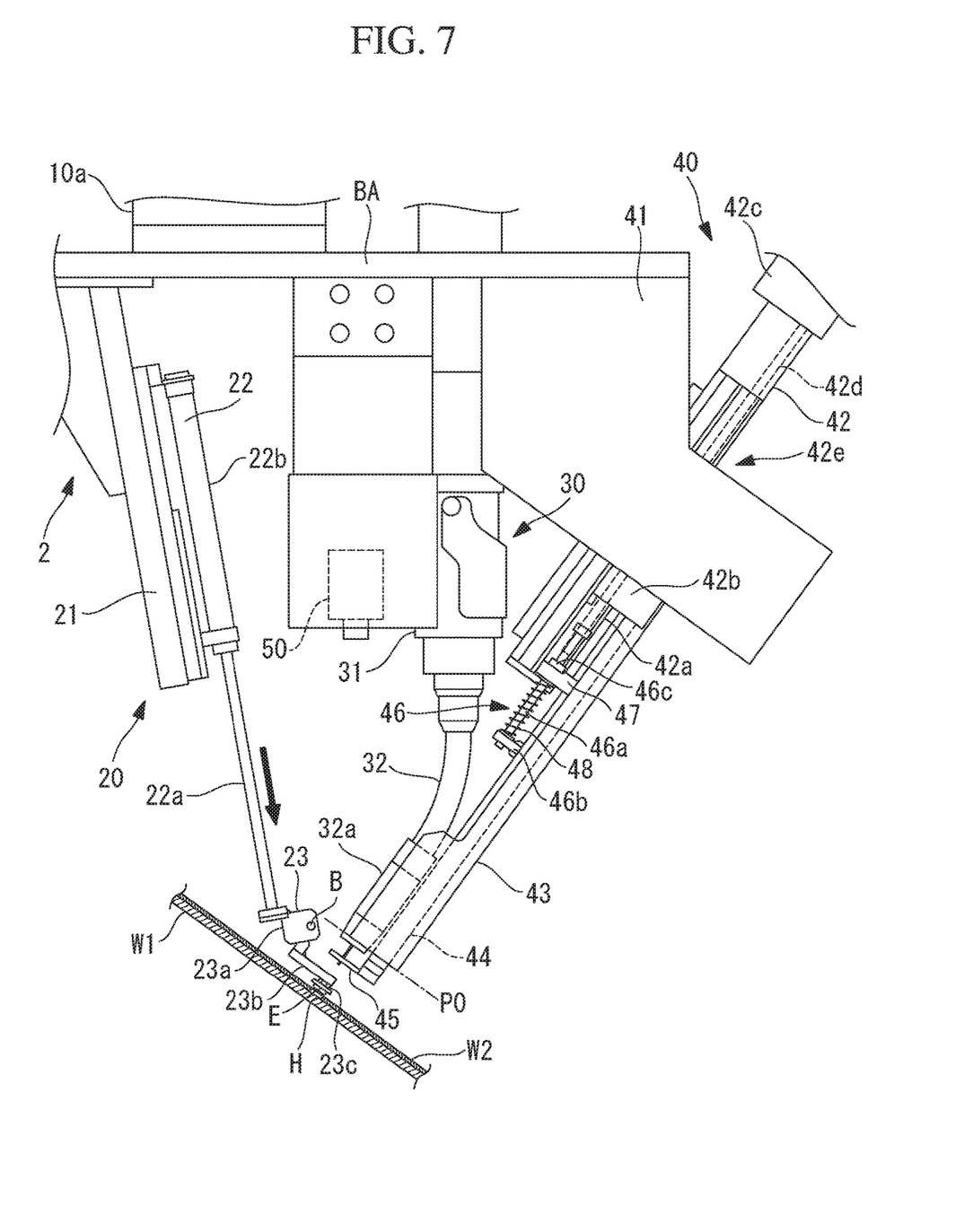
FIG. 7 illustrates the motion of the robot and the tool according to this embodiment.

Subsequently, as shown in FIG. 7, the controller 60 moves the rod 22a of the air cylinder 22 to a predetermined protruding position (step S3). For example, the controller 60 sets the rod 22a of the air cylinder 22 to a maximally protruding state. Accordingly, the welding element E supported by the support member 23b is disposed between the gas nozzle 32a of the welding torch 30 and the through-hole H in the second component W2. At this time, the component pusher 43 is disposed at a retracted position P0 by the driving device 42c. Moreover, the abutment section 46c is in abutment with the support member 47 of the component pusher 43, so that the element holder 45 of the element pusher 44 is also disposed at a position near the welding torch 30. The order in which step S2 and step S3 are performed may be inverted.

Figure 8:
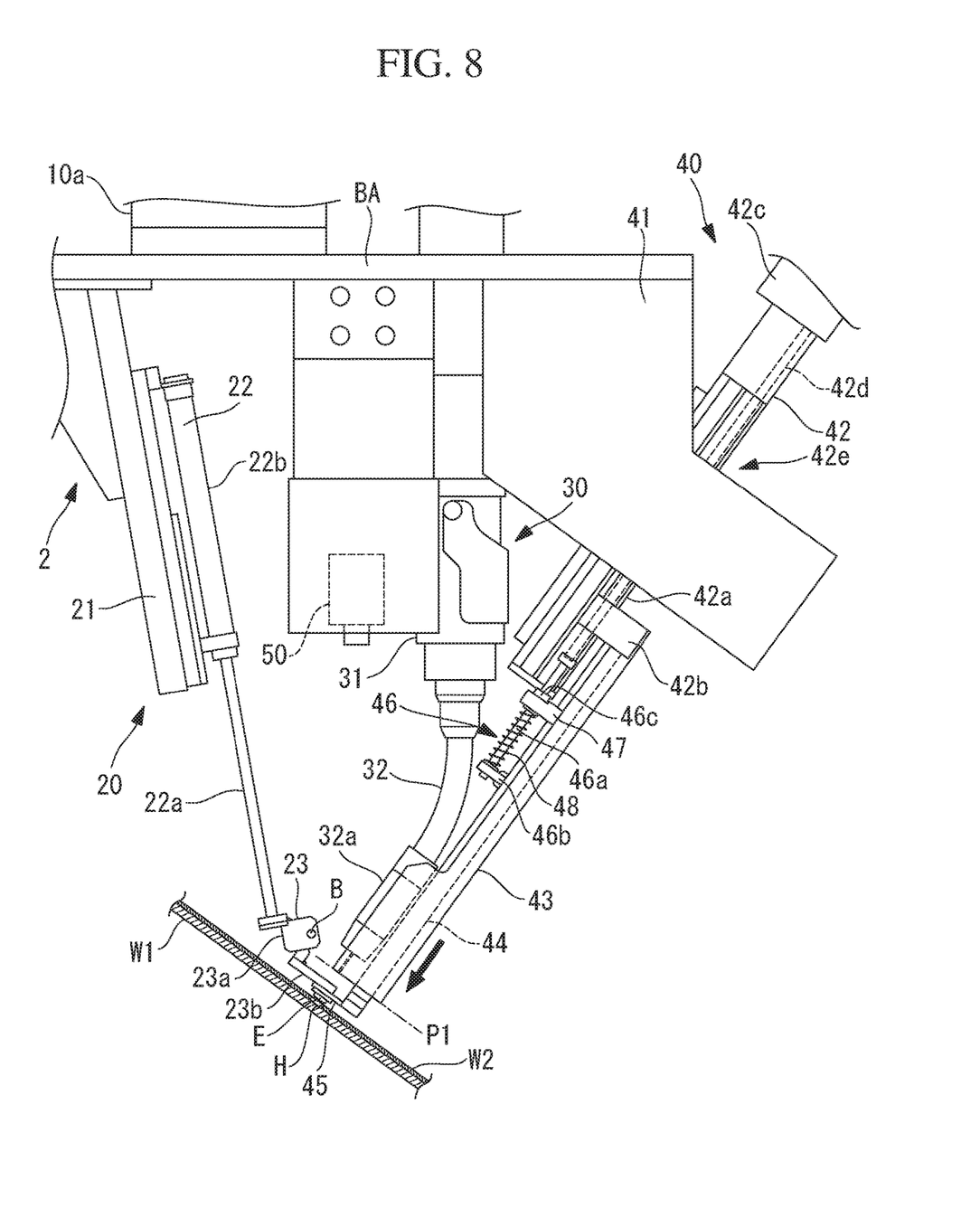
FIG. 8 illustrates the motion of the robot and the tool according to this embodiment.

Subsequently, as shown in FIG. 8, the controller 60 uses the driving device 42c to dispose the component pusher 43 at a first forward position P1 (step S4). The first forward position P1 is located closer to the second component W2 than the retracted position P0 is. Accordingly, the welding element E supported by the support member 23b is held by the element holder 45 of the element pusher 44.

The orientation of the support member 23b relative to the support base 23a of the element supporter 23 is adjustable by loosening the bolt B. This configuration is advantageous for achieving smooth movement of the welding element E from the support member 23b to the element holder 45.

Figure 9:
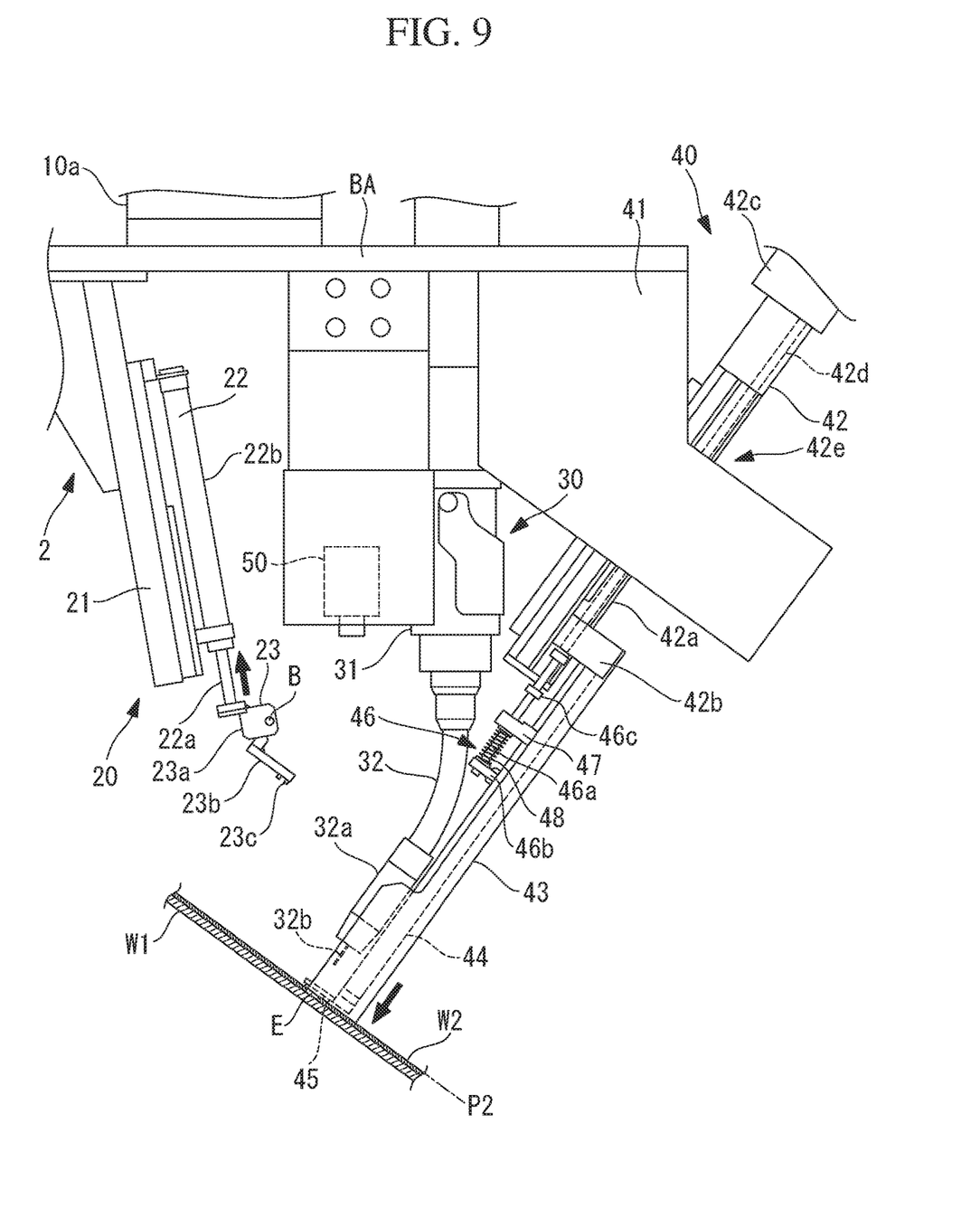
FIG. 9 illustrates the motion of the robot and the tool according to this embodiment.

Subsequently, as shown in FIG. 9, the controller 60 sets the air cylinder 22 to a compressed state (step S5) and uses the driving device 42c to move the component pusher 43 to a second forward position P2 (step S6). The second forward position P2 is where the component pusher 43 is pressed against the second component W2 by the driving device 42c. Naturally, the second forward position P2 is located closer to the second component W2 than the first forward position P1.

While the component pusher 43 moves from the first forward position P1 to the second forward position P2, the element holder 45 of the element pusher 44 is pressed against the second component W2. At this time, the small-diameter section E2 of the welding element E held by the element holder 45 is disposed within the through-hole H. Alternatively, the welding element E may entirely be disposed within the through-hole H. When the component pusher 43 moves to the second forward position P2 in this state, the element pusher 44 moves relative to the component pusher 43 against the biasing member 48.

In order to press the component pusher 43 against the second component W2 with a predetermined force in step S6, the controller 60 performs force control based on a driving current value of the driving device 42c. Accordingly, the second component W2 is pushed against the first component W1 with a predetermined force.

Figure 10:
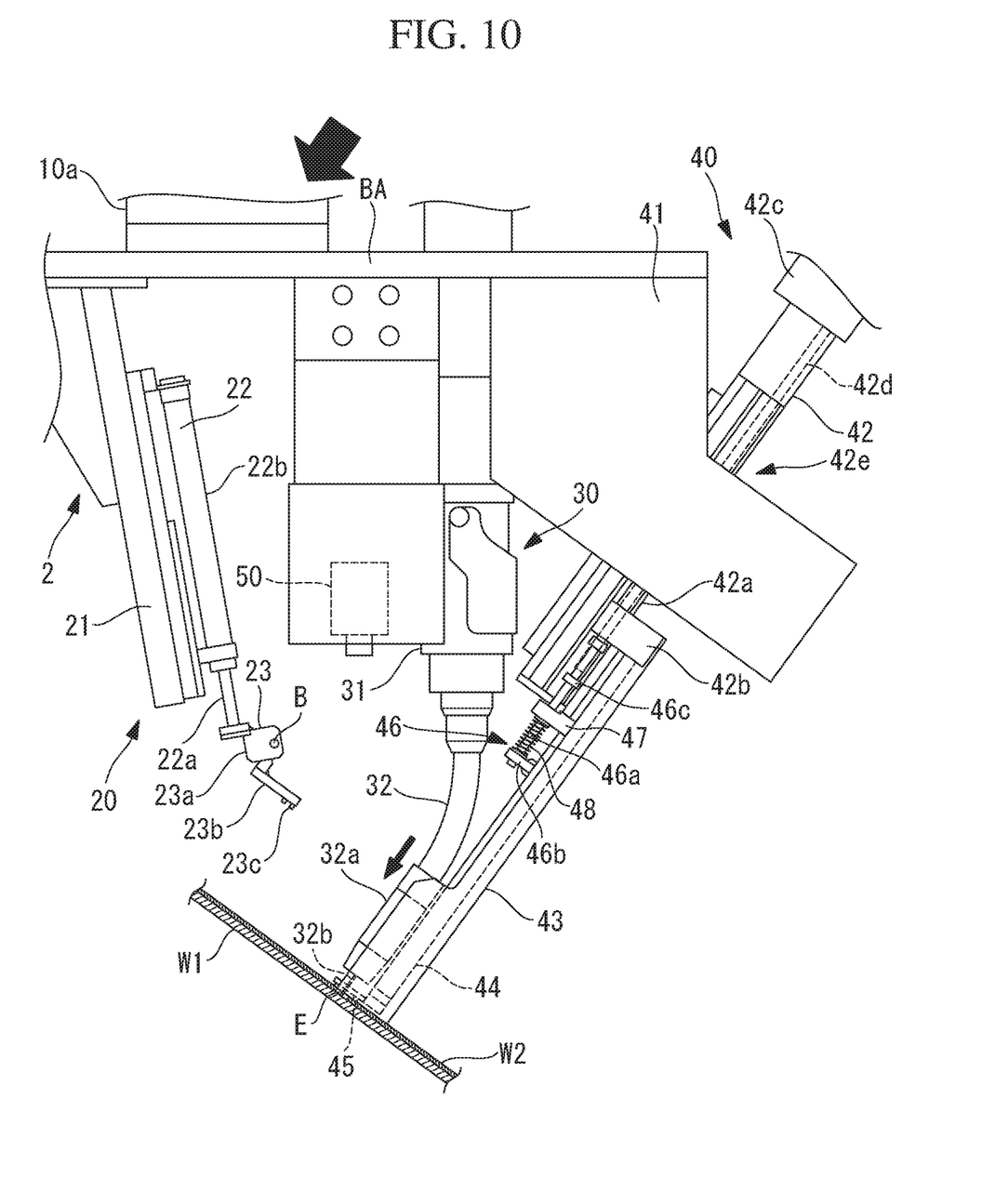
FIG. 10 illustrates the motion of the robot and the tool according to this embodiment.

Subsequently, as shown in FIG. 10, the controller 60 moves the arm 10 by controlling the servomotors 11. The movement of the arm 10 causes the welding torch 30 to approach the second component W2, and the gas nozzle 32a and the electrode 32b of the welding torch 30 to approach the welding element E (step S7). When performing step S7, the controller 60 controls the driving device 42c to move the component pusher 43 toward the retracted position P0 in accordance with the amount of movement of the welding torch 30. Furthermore, when performing step S7, the controller 60 performs the aforementioned force control to maintain the force for pressing the component pusher 43 against the second component W2. Accordingly, in a state where the second component W2 is pushed against the first component W1 by the component pusher 43, the welding torch 30 is brought closer toward the second component W2 and the welding element E.

Subsequently, the controller 60 controls the welding torch 30 to melt the welding element E, thereby welding the first component W1 and the second component W2 together by using the welding element E (step S8).

Then, the controller 60 controls the servomotors 11 to move the arm 10, thereby disposing the tool 2 at a predetermined standby position (step S9).

In this embodiment, the component pusher 43 is movable by the driving device 42c in the axial direction of the distal end of the welding torch 30 relative to the welding torch 30. Therefore, the component pusher 43 is pressed against the second component W2 by the driving device 42c, whereby the second component W2 can be pushed against the first component W1. With this configuration, a gap between the first component W1 and the second component W2 can be appropriately controlled. This is advantageous for improving the welding accuracy.

Furthermore, in this embodiment, the element pusher 44 can dispose at least a part of the held welding element E within the through-hole H in the second component W2 and is movable in the axial direction of the distal end of the welding torch 30 relative to the component pusher 43. Therefore, in a state where at least a part of the welding element E is disposed within the through-hole H by the element pusher 44, the component pusher 43 can move toward the second component W2. This configuration is advantageous for both reliably disposing the welding element E and controlling the gap between the first component W1 and the second component W2.

Furthermore, in this embodiment, the position of the through-hole H is detected by using the visual sensor 50. Therefore, the tool 2 is disposed at an appropriate position corresponding to the through-hole H. This is advantageous for improving the welding accuracy.

Furthermore, in this embodiment, the driving device 42c is a servomotor, and the driving device 42c presses the component pusher against the second component with a predetermined force. This configuration is advantageous for achieving more accurate control of the gap between the first component W1 and the second component W2.

Furthermore, in this embodiment, in a state where the component pusher 43 is pressed against the second component W2 by controlling the driving device 42c, the controller 60 controls the arm 10 to bring the welding torch 30 closer to the second component W2. This configuration is advantageous for accurately controlling the gap between the first component W1 and the second component W2 during welding.

Furthermore, in this embodiment, when bringing the welding torch 30 closer to the second component W2, the controller 60 controls the driving device 42c to move the component pusher 43 relative to the welding torch 30 in accordance with the amount of movement of the welding torch 30 toward the second component W2. This configuration is advantageous for accurately controlling the gap between the first component W1 and the second component W2 during welding.

By using the above-described technology, the welding accuracy can be improved when dissimilar metal welding is performed by using the welding torch 30 attached to the arm 10 of the robot 1.

The invention claimed is:

1. A welding tool for a robot that welds together a first component made of a first metal and a second component made of a second metal by using a metallic welding element disposed within a through-hole provided in the second component, the welding tool comprising:
  a welding torch attached to an arm of the robot;
  a supporter attached to a distal end of the arm and capable of holding the metallic welding element before being disposed within the through-hole;
  an element holder that is provided with a plurality of claws and that receives the metallic welding element held by the supporter to hold the metallic welding element in a state in which the metallic welding element is not disposed within the through-hole; and
  a component pusher, wherein the component pusher comprises a member attached to the distal end of the arm so as to be movable in an axial direction of a distal end of the welding torch and a motor that moves the member in the axial direction,
  wherein the element holder disposes the metallic welding element between the welding torch and the through-hole and disposes at least a part of the metallic welding element within the through-hole.

2. The robot welding tool according to claim 1, further comprising:
  a visual sensor which detects a position of the through-hole.

3. The robot welding tool according to claim 1, further comprising a processor configured to perform a force control based on a driving current value of the motor for pressing the component pusher against the second component with a predetermined force.

4. A robot that welds together a first component made of a first metal and a second component made of a second metal by using a metallic welding element disposed within a through-hole provided in the second component, the robot comprising:
  an arm;
  at least one processor configured to control motion of the arm;
  a welding torch attached to the arm;
  a supporter attached to a distal end of the arm and capable of holding the metallic welding element before being disposed within the through-hole;
  an element holder that is provided with a plurality of claws and that receives the metallic welding element held by the supporter to hold the metallic welding element in a state in which the metallic welding element is not disposed within the through-hole; and
  a component pusher, wherein the component pusher comprises a member attached to the distal end of the arm so as to be movable in an axial direction of a distal end of the welding torch and a motor that moves the member in the axial direction,
  wherein the element holder disposes the metallic welding element between the welding torch and the through-hole and disposes at least a part of the metallic welding element within the through-hole.

5. The robot according to claim 4, wherein the at least one processor is configured to perform a force control based on a driving current value of the motor for pressing the component pusher against the second component with a predetermined force,
  wherein, in a state where the component pusher is pressed against the second component by the motor, the at least one processor performs the force control when the at least one processor controls the arm to bring the welding torch closer to the second component.

6. The robot according to claim 5, wherein, when the welding torch is brought closer to the second component, the at least one processor controls the motor to move the component pusher relative to the welding torch in accordance with an amount of movement of the welding torch toward the second component.

* * * * *